United States Patent [19]

Landfahrer et al.

[11] Patent Number: 5,279,266
[45] Date of Patent: Jan. 18, 1994

[54] TWO-STROKE INTERNAL COMBUSTION ENGINE

[75] Inventors: Klaus Landfahrer; Hans Alten; Karl Wojik, all of Graz, Austria

[73] Assignees: Avl Gesellschaft Für Verbrennungskraftmaschinen und Messtechnik m.b.H; H. C. Hans List, both of Graz, Austria

[21] Appl. No.: 4,269

[22] Filed: Jan. 14, 1993

[30] Foreign Application Priority Data

Jan. 16, 1992 [AT] Austria ................. A 62/92

[51] Int. Cl.⁵ .............................................. F02B 75/02
[52] U.S. Cl. ............................. 123/65 PE; 60/270.1
[58] Field of Search .................. 123/65 PC, 65 EM; 60/270

[56] References Cited

U.S. PATENT DOCUMENTS

| | | | |
|---|---|---|---|
| 4,566,409 | 1/1986 | Yashiro et al. | 123/65 PE |
| 4,672,925 | 6/1987 | Miyata et al. | 123/65 PE |
| 4,751,899 | 6/1988 | Ohki et al. | 123/65 PE |
| 4,768,473 | 9/1988 | Yamamoto et al. | 123/65 PE |
| 4,776,305 | 10/1988 | Oike | 123/65 PE |
| 5,017,801 | 4/1992 | Huang | 123/65 PE |
| 5,063,888 | 11/1991 | Ozawa et al. | 123/65 PE |

Primary Examiner—Tony M. Argenbright
Assistant Examiner—M. Macy
Attorney, Agent, or Firm—Watson, Cole, Grindle & Watson

[57] ABSTRACT

In a two-stroke internal combustion engine with at least one cylinder opening into an exhaust passage with a diffuser-type flare whose shape is determined mainly by that of the lower contour, an optimum flow pattern in the exhaust passage is obtained by providing the exhaust passage with a nozzle-like throat in the immediate vicinity of the cylinder, which is formed by the lower contour and is followed by the diffuser-type flare, either immediately or at a distance.

6 Claims, 3 Drawing Sheets

TWO-STROKE INTERNAL COMBUSTION ENGINE

BACKGROUND OF THE INVENTION

The invention relates to a two-stroke internal combustion engine with at least one cylinder opening into an exhaust passage with a diffuser-type flare established by the shape of the lower contour.

In the design of two-stroke engines the configuration of the exhaust passage is optimised with regard to the flow pattern arising when the exhaust port is completely open. To promote the exchange of charge, large flow cross-sections are desirable. There are, however, design limits to the size of the exhaust cross-section. In particular, the maximum admissible dimensions of the window forming the transition from the exhaust passage into the cylinder will put a limit on the size of the flow cross-section, since neither height nor width of the window can be increased at will.

DESCRIPTION OF THE PRIOR ART

In FR-A 2,584,453 a two-stroke internal combustion engine is described whose exhaust passage has a cross-section that widens in the flow direction. When the exhaust port is open only partly, however, this known type of design will produce considerable burbling and turbulences in the exhaust passage in the vicinity of the piston edge. These turbulences will generate a flow resistance impeding the charge exchange.

SUMMARY OF THE INVENTION

It is an object of the invention to provide a two-stroke internal combustion engine in which the above disadvantages are avoided and in which an optimum flow pattern is obtained when the exhaust port is only partly open.

In the invention this is achieved by providing the exhaust passage with a nozzle-type throat in the immediate vicinity of the cylinder, which is formed by the shape of the lower contour, and which is followed by the diffuser-type flare, either immediately or at a distance.

It has been found that the flow pattern arising when the exhaust port is uncovered only partly is of decisive importance for an optimum exchange of charge. The nozzle-type throat of the exhaust passage, which is a result of the shape of the lower contour, will help minimise or prevent the turbulences in the exhaust passage. It has come unexpected that the narrow passage does not lead to any noticeable increase in flow resistance when the exhaust port is fully open.

A particularly favorable effect will be achieved if the effective area of cross-section of the exhaust passage in the narrowest part of the throat is reduced by 15 to 50 percent, preferably by 20 to 40 percent, as compared to the effective area of cross-section in the part where the exhaust passage connects to the cylinder. In this instance good flow characteristics are obtained in the exhaust passage when the exhaust port is completely open as well as in its partly open state.

Regarding the flow characteristics, it has proved of particular advantage if the smallest cross-section of the exhaust passage is at a given distance from the intersection point of the axis of the exhaust passage and the cylinder surface, which distance is 0.7 to 2 times the height of the exhaust port, port height in this case meaning the distance between lower and upper controlling edge of the exhaust passage.

In a preferred variant of the invention the cylinder is provided with an axially movable piston, and the top of the piston at bottom dead center is located approximately at the level of the lower controlling edge of the exhaust passage.

The exhaust passage may further be provided with an exhaust control element modifying the exhaust cross-section.

The shape of the exhaust passage defined by the invention is particularly useful in engines with an exhaust control, since the special configuration will improve the torque at high speeds. At high speeds the control element is completely open and will thus offer the full cross-section of the exhaust passage. With low speeds on the other hand, an increase of the flow resistance in the exhaust passage even is desirable.

The exhaust passage may further be provided with auxiliary outlets. In this instance the term exhaust cross-section will denote the total of effective flow cross-sections.

BRIEF DESCRIPTION OF THE DRAWINGS

The invention will be further described with reference to the accompanying schematical drawings, in which.

DETAILED DESCRIPTION OF PREFERRED EMBODIMENTS

Figure 1:
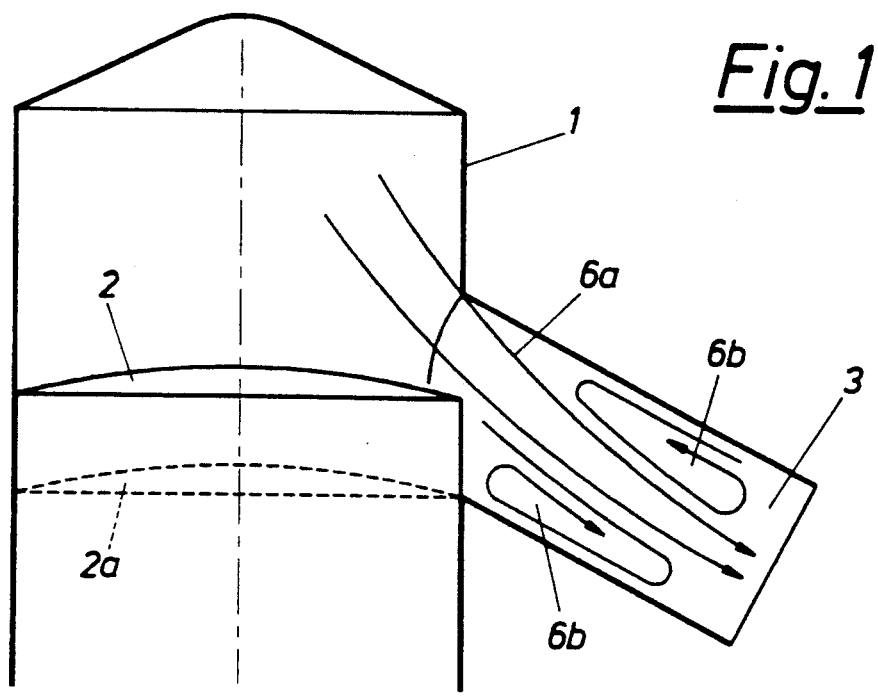
FIG. 1 is a section through a cylinder of a known kind of internal combustion engine.

FIG. 1 shows a section of a cylinder 1 of a conventional engine design, omitting all irrelevant details. In the cylinder 1 an axially movable piston 2 is located. The bottom dead center of piston 2 is marked by a broken line 2a. The cylinder 1 is connected to an exhaust passage 3 with an essentially constant cross-section. As will be seen, comparatively large eddies 6b will develop adjacent to the main flow 6a, generating a relatively high flow resistance.

Figure 2:
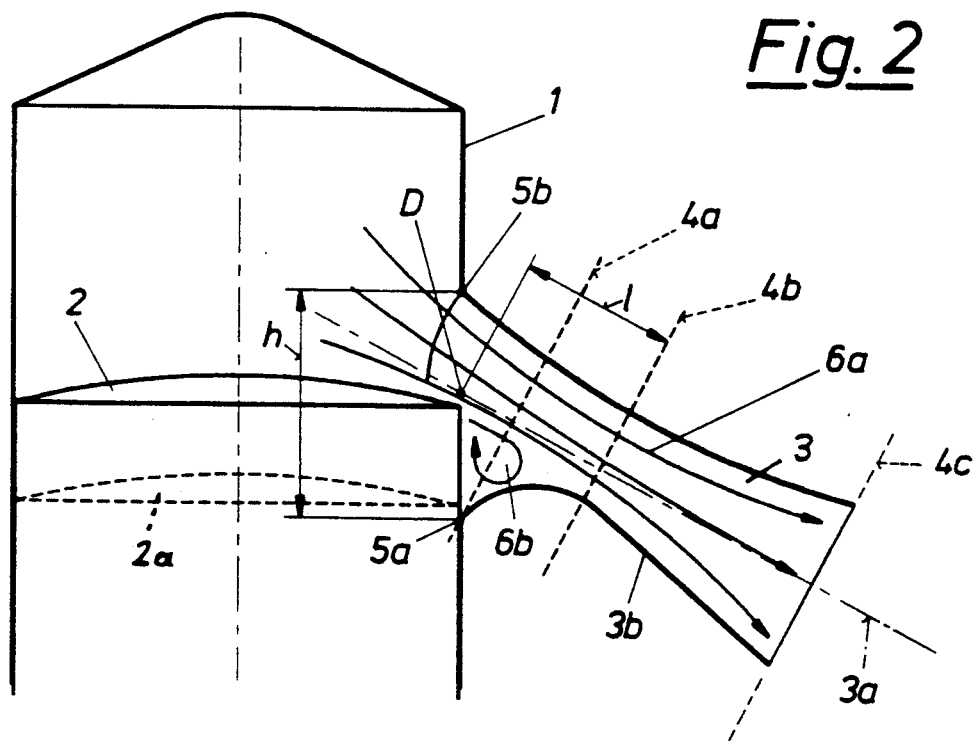
FIG. 2 is a section through a cylinder of the internal combustion engine of the invention.

In FIG. 2 a cylinder 1 of an engine of the invention is shown. Again, the piston 2 is presented as a broken line 2a at bottom dead center. The lower controlling edge 5a of the exhaust passage 3 is near the top of the piston 2 at the bottom dead center 2a. The port height h is defined as the distance of the lower controlling edge 5a from the upper controlling edge 5b. The flow cross-sections 4a, 4b, 4c are defined as cross-sections of the exhaust passage 3 which are normal to the axis 3a of the exhaust passage. Flow cross-section 4a at the exhaust port is the cross-section passing through the lower controlling edge 5a. Flow cross-section 4b is the one at the narrowest part of the exhaust passage 3. Flow cross-section 4c at the end of the diffuser-type flare of the exhaust passage 3 roughly corresponds to cross-section 4a. In the area of the cylinder the cross-sections 4a, 4b, and 4c are rectangular in shape, whereas they may assume a circular or oval shape further down. This is of no functional relevance, however. FIG. 2 further shows that the narrowing of the cross-section is mainly obtained by appropriately shaping the lower contour 3b of the exhaust passage 3. The cross-section 4b is reduced to about half of the cross-section 4a.

The distance 1 of the narrowest flow cross-section 4b from the intersection point D where the passage axis 3a intersects with the surface of the cylinder 1, approximately corresponds to the port height h. As can be seen, the main flow 6a is hardly impeded. The small eddy 6b behind the edge of the piston will generate only little flow resistance. The length of the exhaust passage is of no immediate relevance. Configuring the passage 3 as required by the invention basically involves the addition of the diffuser following the narrowest cross-section 4b, as this is the only way to avoid high resistances when the exhaust port is fully open. Once the narrowest section 4b has been reached this cross-section may be maintained for a length of up to five times the hydraulic diameter of the exhaust passage 3, before widening into the diffuser-type flare.

As regards optimisation criteria for the smallest section 4b, it should be noted that when the port openings are small, the best flow patterns are obtained with increasingly reduced cross-sections, whereas when the ports are fully open, this will lead to increasingly large flow losses. Optimisation efforts aim at finding the smallest cross-section 4b with which the flow is not noticeably impeded when the port is fully open.

Figure 3:
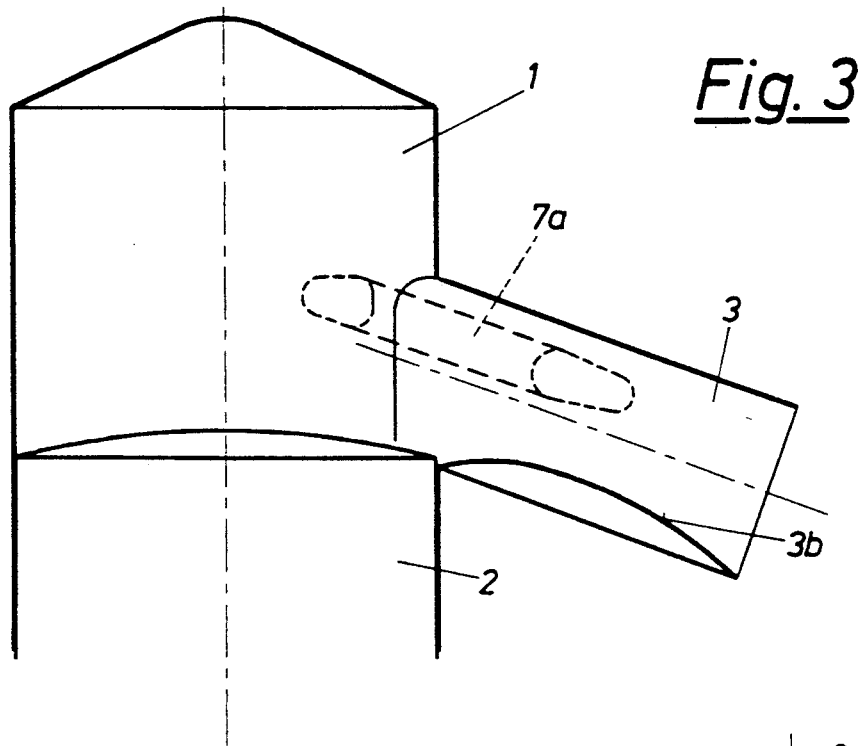
FIG. 3 is a section of another variant of the invention.
Figure 4:
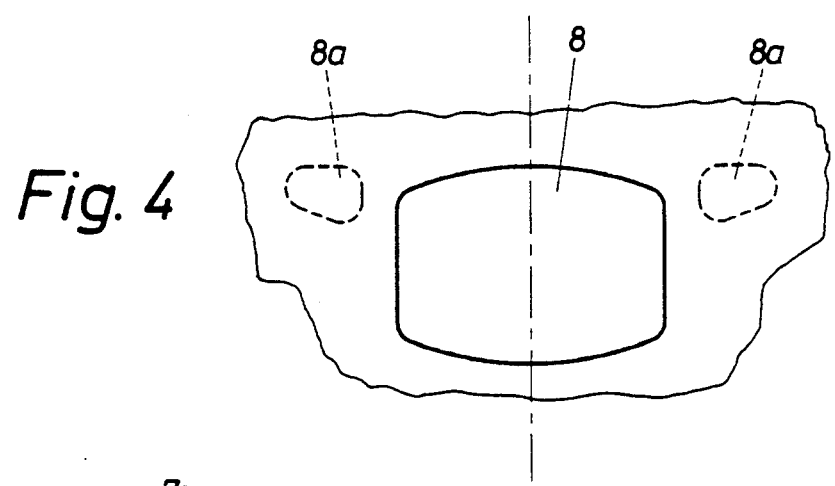
FIG. 4 is a view of the variant of FIG. 3 from the inside of the cylinder.
Figure 5:
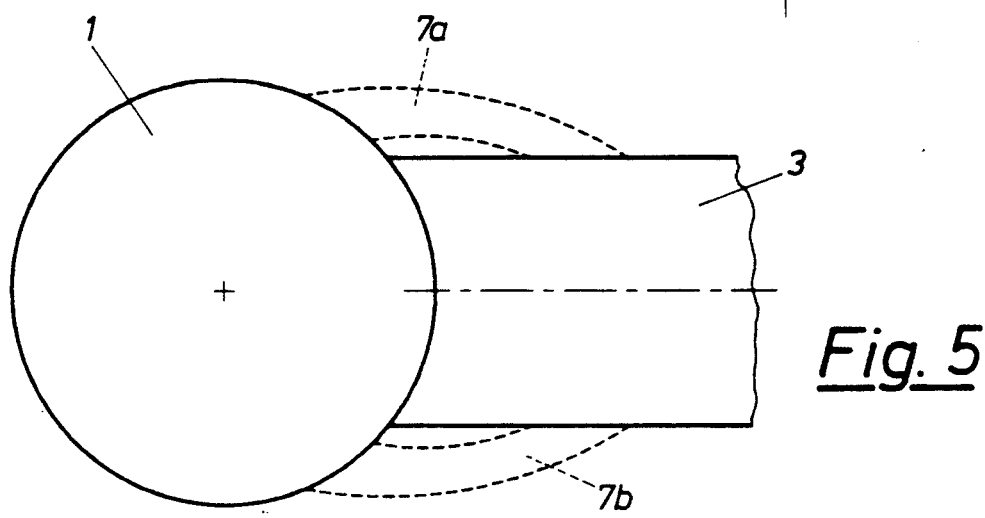
FIG. 5 is a view from above of the variant of FIGS. 3 and 4.

FIGS. 3, 4, and 5 show a variant of the invention with auxiliary outlets 7a, 7b. FIG. 4 shows the shape of the window 8 defining the opening of the exhaust passage 3 into the cylinder 1. On the two sides windows 8a and 8b of the auxiliary outlets 7a and 7b are outlined.

Figure 6:
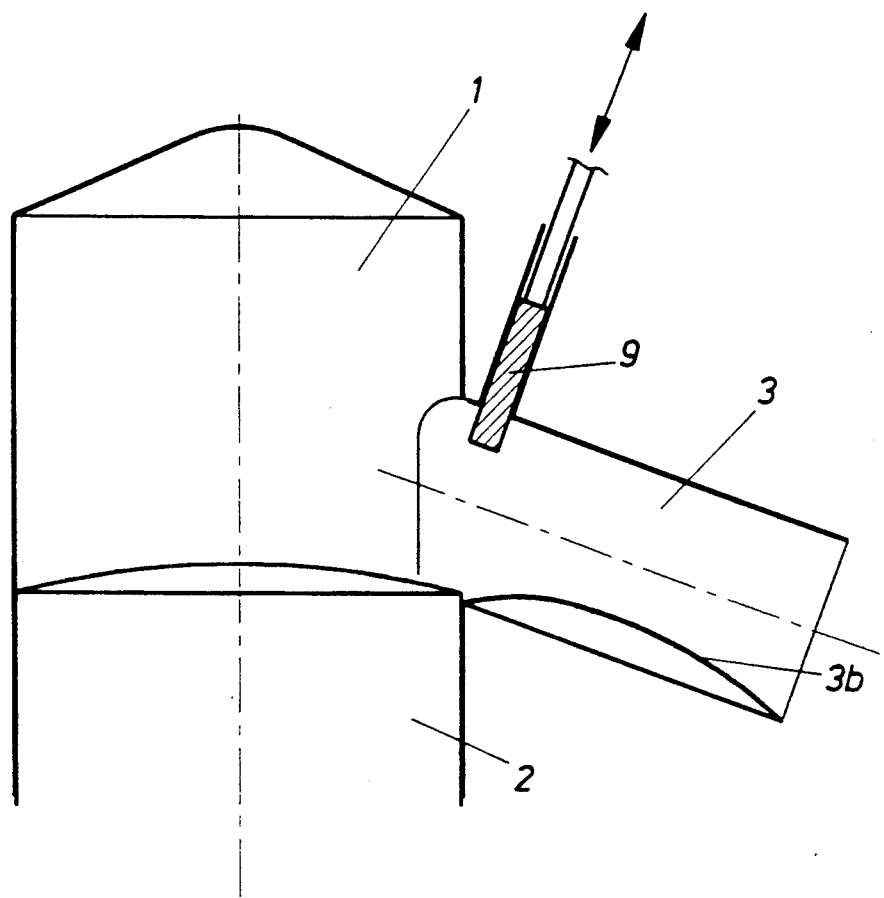
FIG. 6 is a section of another variant of the invention.

FIG. 6 presents another variant of the invention. In this instance a slide 9 is provided as an exhaust control element, which will impede the exhaust flow as it is leaving the cylinder 1 for a precisely timed period after the opening of the exhaust port 3, thus modifying the exhaust control time of the engine. At high speeds the slide 9 is fully retracted, producing the same flow situation as in FIG. 2.

Tests have shown that optimum conditions are obtained when the cross-section 4b is diminished by 15–50 percent of the efficient cross-section 4a at the exhaust port 3. In this case the flow may be improved by approximately 25 percent for a given pressure difference, when the exhaust port is 30–50% open. When the exhaust port is completely open, it has been possible with the investigated variant to avoid any negative effects on the flow.

We claim:

1. A two-stroke internal combustion engine with at least one cylinder opening into an exhaust passage, wherein said exhaust passage is provided with a nozzle-type throat in the immediate vicinity of said cylinder, which is formed by the shape of the lower contour of said exhaust passage, and which is followed by a diffuser-type flare.

2. An internal combustion engine according to claim 1, wherein an effective area of cross-section of said exhaust passage in the narrowest part of said throat is reduced by 15 to 50 percent, as compared to an effective area of cross-section in a part where said exhaust passage is connected to said cylinder.

3. An internal combustion engine according to claim 2, wherein said effective area of cross-section of said exhaust passage in the narrowest part of said throat is reduced by 20 to 40 percent.

4. An internal combustion engine according to claim 1, wherein the smallest cross-section of said exhaust passage is at a given distance from an intersection point of the axis of said exhaust passage and the surface of said cylinder, which distance is 0.7 to 2 times the height of the exhaust port, said port height in this case meaning the distance between lower and upper controlling edges of said exhaust passage.

5. An internal combustion engine according to claim 1, wherein said exhaust passage is provided with an exhaust control element modifying the exhaust cross-section.

6. An internal combustion engine according to claim 1, wherein said exhaust passage is provided with at least one auxiliary outlet.

* * * * *

UNITED STATES PATENT AND TRADEMARK OFFICE
CERTIFICATE OF CORRECTION

PATENT NO. : 5,279,266
DATED : January 16, 1994
INVENTOR(S) : Klaus LANDFAHRER et al.

It is certified that error appears in the above-indentified patent and that said Letters Patent is hereby corrected as shown below:

On the title page, item [73], the assignee should read as follows:

[73] Assignee: AVL Gesellschaft für

Verbrennungskraftmaschinen und Messtechnik M.B.H. Prof.

Dr.Dr.H.C. Hans List, Graz, Austria.

Signed and Sealed this

Tenth Day of May, 1994

*Attest:*

BRUCE LEHMAN

*Attesting Officer*     *Commissioner of Patents and Trademarks*